Sept. 28, 1954 L. M. FRIEDMANN ET AL 2,690,477

TELEPHONE ALARM SYSTEM

Filed Oct. 23, 1953

LOUIS M. FRIEDMANN
KARL F. ROSS
INVENTORS.

BY Karl F. Ross
AGENT

Patented Sept. 28, 1954 2,690,477

UNITED STATES PATENT OFFICE 2,690,477

TELEPHONE ALARM SYSTEM

Louis Martin Friedmann and Karl Frank Ross,
New York, N. Y.

Application October 23, 1953, Serial No. 387,979

20 Claims. (Cl. 179—5)

Our present invention relates to an alarm system for telephone installations and the like designed to advise an operator at a central office or exchange of the existence of an emergency condition on a line leading to an outlying station or subscriber.

The general object of our invention is to provide an alarm system of this description which will indicate any major change in the condition of the line and which, in particular, will be effective when the line is severed through any cause, as by fire or by the act of an intruder, yet which preferably will also register any short-circuiting of the line due, for example, to intense heat, flood water or destructive handling.

An ancillary object of our invention is to provide means for temporarily inactivating the aforementioned alarm system as long as the line is in normal use for either outgoing or incoming calls.

It is also an object of our invention to provide means for accomplishing the foregoing objects with only minor changes in the layout of conventional telephone installations.

A feature of our invention resides in a capacitive termination for the normally open outlying or subscriber end of the line which will present a very high resistance to direct current but will constitute only a relatively low impedance for alternating current, whereby discriminating equipment at the exchange responsive to such alternating current will be able to distinguish between a normal condition and a break in the line.

In a specific embodiment there is provided a reactive bridge circuit having the conductors of the supervised two-wire line included in one of its arms. A source of alternating current energizes an alarm circuit whenever the impedance of the aforementioned bridge arm is materially altered, as by the occurrence of a break in either or both of the line conductors.

According to another feature of the invention, the alarm circuit is inactivated by the operation of a direct-current-responsive device, such as the usual line relay, whenever the change in impedance is due to closure of the line loop upon the initiation of an outgoing call over the protected line.

According to a further feature of the invention, the alarm circuit is also inactivated by the operation of switch means under the control of a distant subscriber (or of the operator at the exchange) whenever the protected line is seized for an incoming call, whereby the possibility of a false alarm due to a loading of the line by extension of the circuits will be avoided.

According to still another feature of the invention, the line loop closed by the usual receiver-operated contacts is made sufficiently inductive to constitute an A.-C. impedance enabling the discriminating equipment to distinguish between a condition of closure due to the lifting of the receiver and a short circuit on the line arising from other causes.

The above and other objects and features of our invention will become more fully apparent from the following description, taken with reference to the accompanying drawing in which.

Figures 1, 2:
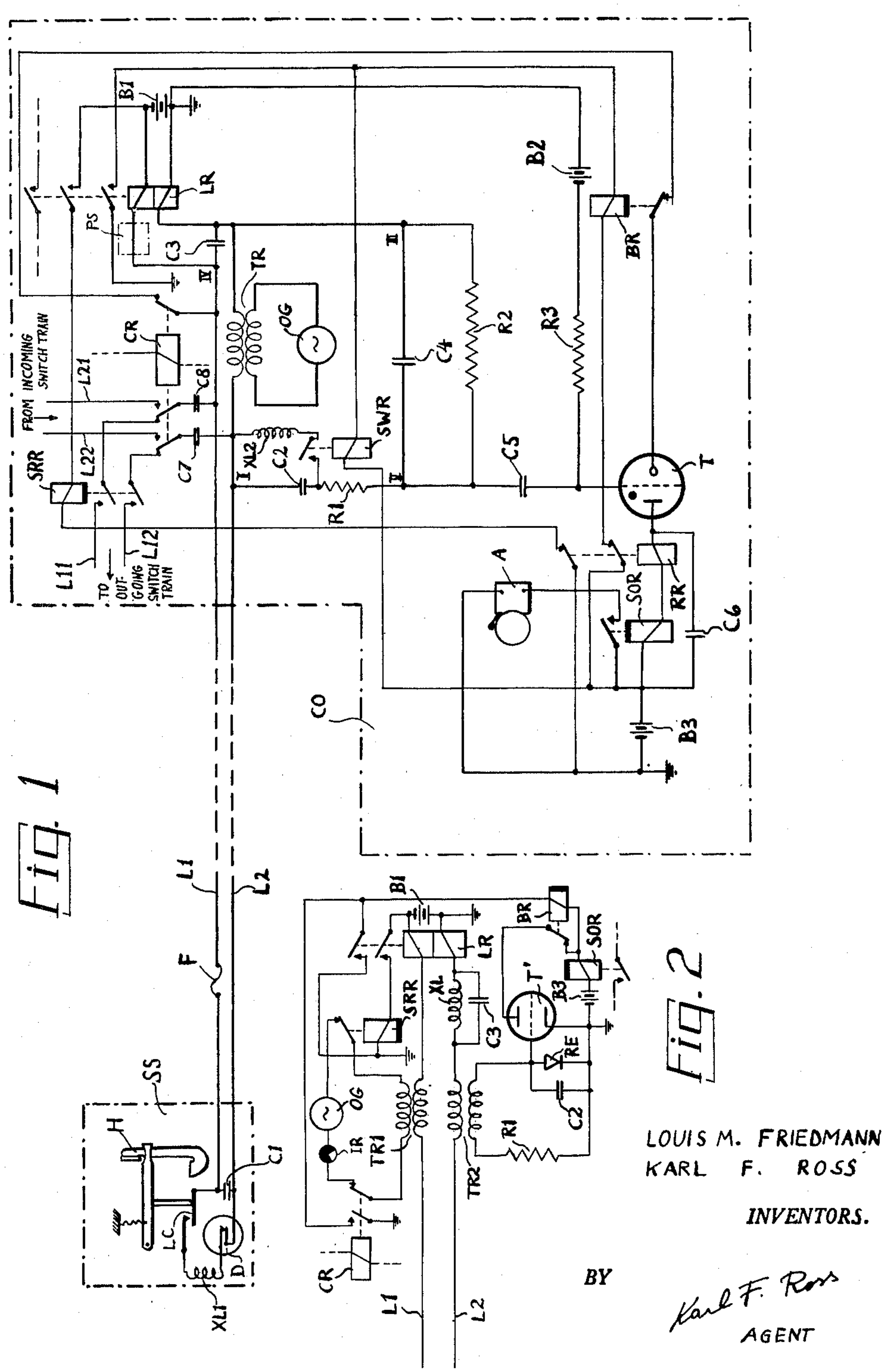
Fig. 1 is a circuit diagram of an alarm system according to our invention.
Fig. 2 shows a partial modification of the circuits of Fig. 1.

In Fig. 1 of the drawing, where conventional elements not essential for an understanding of the invention have been omitted, there is shown a central office CO and an outlying subscriber station SS connected to the former over a line having two conductors L1, L2. The subscriber end of the line is normally open for direct current at the line contacts LC controlled from the handset H. The usual dial contacts D are connected in series with contacts LC and conductor L2, and an inductance XL1 has been inserted between contacts LC and D.

At the central office CO the conductors L1, L2 extend in the conventional manner to the windings of a line relay LR which is energized from a battery B1 when the line loop is closed at LC. Relay LR has three armatures, the uppermost of which serves to repeat the dial pulses to a switching stage (not shown) according to well-known principles. The intermediate armature of this relay closes a circuit, by way of the upper armature and back contact of a rapidly operating relay RR, for energizing a slow-releasing relay SRR which keeps its armatures attracted during dialing and, by way of said armatures, extends the conductors L1, L2 via D.-C. blocking condensers C7, C8, left-hand armatures and back contacts of a connecting relay CR to a pair of outgoing leads L11, L12 terminating at the first stage of an outgoing switch train, such as a line finder (not shown). Relay CR is adapted to be energized under the control of another subscriber or of the exchange operator, over conventional circuits not further illustrated, whenever the line L1, L2 is seized for an incoming call; when this relay operates, its two left-hand armatures extend the conductors L1, L2 by way of condensers C7, C8 and a pair of incoming leads L21, L22 to the final stage of an incoming switch train, such as a selector (not shown).

A reactive bridge circuit is defined by four arms whose junction points have been indicated at I, II, III and IV. One arm, extending between junctions I and IV, comprises line conductor L2, a condenser C1 bridging the contacts D and LC as well as the inductance XL1 at the subscriber station SS, and the line conductor L1; conjugate hereto is another arm, extending between junctions I and II, which comprises the series combination of a condenser C2 and a resistor C1 designed to balance the impedance of the series combination of condenser C1 and line L1, L2. A third arm, extending between junctions III and IV, comprises a condenser C3 bridged across the two windings of line relay LR; conjugate hereto is a fourth arm, extending between junctions II and III, which comprises the parallel combination of a condenser C4 and a resistor R2 designed to balance the impedance of the parallel combination of condenser C3 and relay LR in series with battery B1. Condenser C2 is bridged by an inductance XL2, designed to balance the inductance XL1 at station SS, in series with a front contact and armature of a switching relay SWR.

Connected diagonally across the junctions I, III of the two pairs of conjugate bridge arms is a source of alternating current comprising an oscillation generator OG and a transformer TR. It will be noted that the secondary of this transformer, which should be of low inductance so as not unduly to distort the dial pulses, is connected in series with line conductor L2 so far as the D.-C. loop B1, upper winding of LR, L1, LC, XL1, D, L2, lower winding of LR is concerned.

Connected diagonally across the remaining two junctions II, IV is the input circuit of an alarm device here represented as the grid-cathode circuit of a gas-filled triode tube T. This circuit extends from the cathode of tube T over a back contact and armature of a break relay BR as well as a back contact and right-hand armature of relay CR to junction IV and from junction II over a condenser C5 to the grid of the tube. A grid leak resistor R3 and a biasing battery B2 are connected between the grid of tube T and the grounded positive terminal of battery B1. The anode of this tube is connected to the positive terminal of a battery B3 through the winding of relay RR in series with the winding of a slow-operating relay SOR, the two windings being bridged by a condenser C6; relay SOR, when operated, closes an obvious circuit for an alarm device A, here shown schematically as a bell, in series with battery B3. Parallel energizing circuits extend from this battery to ground through the windings of relays BR and SWR, respectively, via the lowermost front contact and armature of relay LR; the circuit for relay BR also includes the lower armature and back contact of relay RR.

The operation of the alarm system shown in Fig. 1 is as follows:

Normally, the line L1, L2 will be open at LC and its extension beyond condensers C7, C8 will be disconnected at the front contacts of relays CR and SRR. The bridge is then balanced and substantially the same alternating potential will be impressed upon the cathode and the grid of tube T from bridge junctions IV and II, respectively. The relative voltages of batteries B1, B2 and B3 are so chosen that tube T will be non-conducting under these conditions, hence the relay SOR will be de-energized along with relay RR.

When the subscriber at station SS removes handset H from its hook, contacts LC will be closed. This will unbalance the bridge, and relay RR operates immediately to disconnect battery from relay BR and ground from relay SRR. Relay LR operates over the closed line loop and energizes relay SWR, thereby rebalancing the bridge circuit. As a result, relay RR releases and at its lower armature closes the circuit for the operation of break relay BR which interrupts the cathode lead of tube T, thereby preventing re-energization of relay RR. The release of this relay also enables operation of relay SRR which extends the line of the subscriber over outgoing conductors L11, L12; thus, a call to another party may now proceed in the usual manner. Relay BR is sufficiently slow-releasing to remain operated during dialing, the same as relay SRR.

When a call for station SS comes in over line L21, L22, relay CR is operated (e. g. from the final selector) and at its right-hand armature interrupts the cathode lead of tube T before the unbalancing of the bridge, resulting from the extension of the subscriber line L1, L2 over leads L21, L22, has had time to operate the relay SOR. Relay RR may operate briefly and ineffectively. Relay CR, releasing when the calling subscriber hangs up his receiver (or when the operator at the central station terminates the connection), restores the circuits to the condition illustrated as soon as the incoming call has been completed.

Let us assume, now, that an intruder has ripped the telephone at station SS off the wall, or that a fuse F inserted in conductor L1 has melted owing to the occurrence of a fire on the premises. The resulting rise in the impedance of the bridge arm I—IV reduces the amplitudes of the supervisory signal across condenser C3 without materially affecting the voltage swing on the grid of tube T. The tube T will, therefore, conduct on alternate half cycles of the output of generator OG and an operating current, whose pulsations are smoothed by the condenser C6, will flow through the windings of relays RR and SOR, thereby causing actuation of alarm device A.

Again, let us assume that a spike has been driven through the wires L1, L2 or that these wires have been short-circuited in some other manner between stations SS and CO. Relays LR and SWR will operate as before, but the bridge I—II—III—IV will not be balanced after the latter relay has attracted its armature since the relatively high impedance represented by parallel reactances XL1 and C1 has been short-circuited. As a result, relay RR will remain energized and relay SOR will operate after a certain delay, thereby actuating the alarm device A.

Fig. 2 shows a somewhat simplified system adapted to respond only to a break in the subscriber line but not to a short circuit thereof. In this system, the oscillation generator OG works into the primary of a transformer TR1, whose secondary is inserted in conductor L1, over a circuit including back contacts and armatures of relays CR and SRR in series. Relay SRR is energizable directly from ground through its winding over the lower front contact and armature of relay LR connected to positive battery. It will be understood that relays LR, CR and SRR may have additional armatures, not shown in Fig. 2, similar to those illustrated in Fig. 1 and for the purposes described in connection therewith.

A second transformer TR2 has its primary inserted in conductor L2 and separated from the lower winding of relay LR by the parallel combination of a condenser C3 and an inductance XL, this combination representing a filter of high impedance for the frequency of generator OG. The secondary of transformer TR2 is connected in series with a resistor R1 and a rectifier RE, the latter being shunted by a condenser C2. Connected across rectifier RE and condenser C2 is the grid-cathode circuit of a vacuum triode T' in such manner that the tube will be biased beyond cutoff when oscillations of substantial magnitude are impressed upon the rectifier. Relay SOR, whose armature controls an alarm circuit which may be similar to that of Fig. 1 but has not been further illustrated in Fig. 2, is connected in the plate circuit of tube T' in series with an armature and break contact of relay BR as well as battery B3. An energizing circuit for relay BR extends from this battery through its winding to ground via the upper armature and front contact of relay LR and in parallel therewith to ground via an inner front contact and armature of relay CR.

Normally, the amplitudes of the alternating current passing from transformer TR1 over conductor L1, condenser C1 of station SS (Fig. 1) and conductor L2 to transformer TR2 will be large enough to maintain the tube T' non-conductive and to prevent energization of relay SOR. When a break occurs in the line, transmission of this current will be substantially completely interrupted and relay SOR operates in due course, closing the alarm circuit. If, however, oscillations cease because of the operation of relays LR, SRR on outgoing calls or the operation of relay CR on incoming calls, relay BR will operate over either of its previously traced energizing circuits and will prevent untimely actuation of the alarm. It may be mentioned that the coil XL1 of station SS is functionless in the system of Fig. 2 and may be omitted.

In the system of Fig. 1 it will be desirable to select the operating frequency of oscillator OG outside the voice frequency band to be transmitted over the line. This will not be necessary in the modified arrangement of Fig. 2, where this frequency will be removed from the line on any call. It will be understood, moreover, that this supervisory frequency need not be applied continuously to the idle line but that, instead, brief impulses at longer or shorter intervals may be used, whereby oscillations of larger amplitude could be transmitted without objectionable heating effects or energy dissipation. A means for accomplishing this purpose has been shown in Fig. 2 in the form of an interrupter IR in series with generator OG.

Furthermore, since the various reactances (such as C1, C3, XL1) will have to be so selected as not to cause excessive distortion of the dial pulses from contacts D, it may not always be possible to make condenser C3 in Fig. 1 of such value that only a small fraction of the alternating current from transformer TR will pass through the windings of relay LR. In that situation it may be desirable to insert means for attenuating this alternating current in either or both line conductors to the right of condenser C3 (e. g. a filter such as shown in Fig. 2 at C3, XL) and/or to include therein phase-shifting means PS (dot-dash lines, Fig. 1) to bring about substantially mutual cancellation of the magnetic fields from the two windings of relay LR. Clearly, all such attenuations and phase shifts, including particularly the phase shift occurring over the line L1, L2, will have to be reflected by suitable design of the impedances in the arms of the bridge circuit and, if necessary, by the insertion therein of compensating phase shifting means.

The embodiments herein disclosed are, of course, capable of numerous modifications and adaptations without departing from the spirit and scope of the invention as defined in the objects and in the appended claims.

We claim:

1. In a communication system, in combination, an exchange, an outlying station, a two-wire line extending between said exchange and said station, capacitive impedance means connected across said line at said station, a source of alternating current at said exchange, circuit means for applying current from said source to one of the wires of said line, alternating-current-responsive discriminator means connected to the other of said wires for determining the intensity of said current as transmitted over said line, and alarm means controlled by said discriminator means for operation in response to a deviation of said current intensity from a normal value.

2. The combination according to claim 1, wherein said station is provided with switch means for closing a direct-current connection between the wires of said line and said exchange is provided with a source of direct current connected across said line and with direct-current-responsive relay means in series therewith, said discriminator means being provided with an operating circuit including contacts controlled by said relay means to inactivate said discriminator means upon closure of said direct-current connection.

3. The combination according to claim 2, including inductive impedance means inserted in said direct-current connection in series with said switch means, said discriminator means being provided with contacts for inactivating said relay means in response to alternating-current amplitudes greater than those resulting from transmission of said alternating current through said inductive impedance means.

4. The combination according to claim 2, wherein said relay means comprises a line relay with two windings respectively in series with said wires, said exchange being further provided with oscillation-controlling impedance means for substantially balancing the magnetic effects of said alternating current upon said two windings.

5. The combination according to claim 4, wherein said oscillation-controlling means includes a phase shifter in series with one of said wires.

6. The combination according to claim 2, wherein said exchange is provided with filter means inserted in said line between said source of alternating current and said relay means, said filter means offering a high impedance to said alternating current.

7. The combination according to claim 1, wherein said circuit means includes means for only intermittently applying said alternating current to said line.

8. The combination according to claim 1, wherein said exchange is provided with relay means responsive to the arrival of a call for said station over said line, said relay means having contacts for inactivating said alarm means upon the occurrence of such call.

9. In a communication system, in combination, an exchange with incoming and outgoing switch trains, an outgoing line having conductors terminating at said exchange, relay means at said exchange for connecting said conductors to any of said switch trains, a source of alternating current at said exchange, circuit means for applying current from said source to one of said conductors, discriminator means connected to another of said conductors for determining the intensity of said current as transmitted over said line, indicator means controlled by said discriminator means in response to said intensity for detecting an off-normal condition of said line, and switch means controlled by said relay means for inactivating said discriminator means upon connection of said line to any of said switch trains.

10. In a communication system, in combination, an exchange, an outgoing line extending from said exchange, said line normally having a finite alternating-current impedance at its end remote from said exchange, impedance means at said exchange substantially duplicating the normal impedance of said line as seen from said exchange, circuit means connecting said line and said impedance means in a normally balanced bridge circuit, a source of alternating current connected across the input of said bridge circuit, and indicator means connected across the output of said bridge circuit for detecting a change in said line impedance.

11. The combination according to claim 10, wherein said exchange includes switch means for extending said line, said switch means having contacts for inactivating said indicator means upon a change in the connections of said line.

12. The combination according to claim 11, wherein said exchange includes incoming and outgoing switch trains normally disconnected from said line, said switch means inactivating said indicator means upon connecting said line to any of said switch trains.

13. The combination according to claim 10, wherein said line comprises a pair of wires having normally open contacts at said remote end and capacitive impedance means bridging said contacts, said exchange including a source of direct current connected across said wires and relay means connected to respond to the flow of direct current over said wires, said relay means being provided with contacts for inactivating said indicator means in response to said direct-current flow.

14. The combination according to claim 13, wherein said line comprises inductive impedance means at said remote end in series with said normally open contacts, whereby closure of said normally open contacts will change the alternating-current line impedance as seen from said exchange to another predetermined value, said exchange being provided with switch-over means controlled by said relay means for substantially rebalancing said bridge circuit, upon closure of said normally open contacts, in response to flow of direct current over said wires, and detector means controlled by said relay means for indicating failure of said switch-over means to rebalance said bridge circuit.

15. The combination according to claim 14, wherein said exchange further includes switch means controlled by said detector means and operable by said relay means for extending said line only in the rebalanced condition of said bridge circuit.

16. In a telephone system, in combination, a subscriber station, a central office and a two-wire line extending therebetween; said subscriber station being provided with receiver-operated contacts for closing the wires of said line into a loop, inductive impedance means in said loop in series with said contacts, and capacitive impedance means bridged across said contacts; said exchange being provided with detector means for measuring the impedance of said line, said detector means comprising a source of alternating current, circuit means for passing current from said source over said line and alarm means controlled by said circuit means for indicating a line impedance differing from those normally encountered in the open and in the closed condition of said loop, respectively.

17. The combination according to claim 16, wherein said capacitive means is in shunt with the series combination of said inductive impedance means and said contacts, thereby constituting a filter offering a substantial impedance to alternating current from said source.

18. The combination according to claim 16, wherein said exchange includes a source of direct current connected across said wires, relay means in series with said source of direct current, and switch means controlled by said relay means for extending said line in response to closure of said contacts, said alarm means inactivating said switch means upon being actuated by said circuit means.

19. The combination according to claim 18, wherein said circuit means comprises a bridge circuit normally balanced for the open-loop condition of said line and switch-over means controlled by said relay means for balancing said bridge circuit for the closed-loop condition of said line.

20. The combination according to claim 19, wherein said detector means further includes blocking means controlled jointly by said relay means and by said bridge circuit for maintaining said alarm means inoperative upon brief interruptions in the flow of direct current over said closed loop.

References Cited in the file of this patent

UNITED STATES PATENTS

| Number | Name | Date |
|---|---|---|
| 949,881 | Bullard | Feb. 22, 1910 |
| 1,196,876 | Lubberger | Sept. 5, 1916 |
| 1,340,933 | Clausen | May 25, 1920 |
| 2,383,312 | Herrick | Aug. 21, 1945 |